(12) United States Patent
Harrington et al.

(10) Patent No.: US 6,777,918 B2
(45) Date of Patent: Aug. 17, 2004

(54) VOLTAGE REGULATOR PROVIDING MULTIPLE OUTPUT VOLTAGES

(75) Inventors: Peter B. Harrington, Folsom, CA (US); Johnny Javanifard, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/328,845

(22) Filed: Dec. 23, 2002

(65) Prior Publication Data

US 2004/0119446 A1 Jun. 24, 2004

(51) Int. Cl.[7] .............................................. G05F 1/656
(52) U.S. Cl. ..................... 323/222; 323/284; 323/224
(58) Field of Search ................................ 323/222, 224, 323/282, 284

(56) References Cited

U.S. PATENT DOCUMENTS

| | | | | |
|---|---|---|---|---|
| 5,412,308 A | * | 5/1995 | Brown | 323/267 |
| 5,886,508 A | * | 3/1999 | Jutras | 323/267 |
| 6,075,295 A | * | 6/2000 | Li | 307/39 |
| 6,222,352 B1 | * | 4/2001 | Lenk | 323/267 |
| 6,437,545 B2 | * | 8/2002 | Sluijs | 323/222 |
| 6,600,300 B2 | * | 7/2003 | Groeneveld et al. | 323/282 |
| 6,636,022 B2 | * | 10/2003 | Sluijs | 323/222 |

OTHER PUBLICATIONS

IEEE Journal of Solid State Circuits, vol. 38, No. 1; Single–Inductor Multiple–Output Switching Converters With Time–Multiplexing Control in Discontinuous Conduction Mode; Jan., 2003.

* cited by examiner

*Primary Examiner*—Bao Q. Vu
(74) *Attorney, Agent, or Firm*—Trop, Pruner & Hu, P.C.

(57) ABSTRACT

A system includes an inductive element, at least one switch, an output stage and a circuit. The switch(es) is coupled to the inductive element to generate switching cycles. The switch (es) energizes and de-energizes the inductive element to generate each switching cycle. The output stage provides an output voltage. The circuit couples the output stage to the inductive element in response to a first set of the switching cycles and decouples the output stage from the inductive element in response to a second set of the switching cycles. The first set of switching cycles do not overlap the second set of switching cycles in time.

26 Claims, 5 Drawing Sheets

VOLTAGE REGULATOR PROVIDING MULTIPLE OUTPUT VOLTAGES

BACKGROUND

The invention generally relates to a voltage regulator.

A DC-to-DC voltage regulator typically is used to convert a DC input voltage to either a higher or a lower DC output voltage. One type of voltage regulator is a switching regulator that is often chosen due to its small size and efficiency. The switching regulator typically includes one or more switches that are rapidly opened and closed to transfer energy between an inductive element (a stand-alone inductor or a transformer, as examples) and an input voltage source in a manner that regulates the output voltage.

In a power supply system, capacitive charge pumps may be used to produce multiple supply voltages from an output voltage that is provided by a particular voltage regulator. For example, capacitive charge pumps may be used to produce high supply voltages for non-volatile memory operations. The scaling of power supplies to maintain reliable electric fields has led to more stages in capacitive charge pumps and less efficiency for the charge pumps. Furthermore, due to the increased number of stages, the charge pumps typically consume considerable die area.

Thus, a power supply system presents challenges relating to generating multiple supply voltages. Therefore, there is a continuing need for better ways to produce multiple supply voltages.

DETAILED DESCRIPTION

Figure 1:
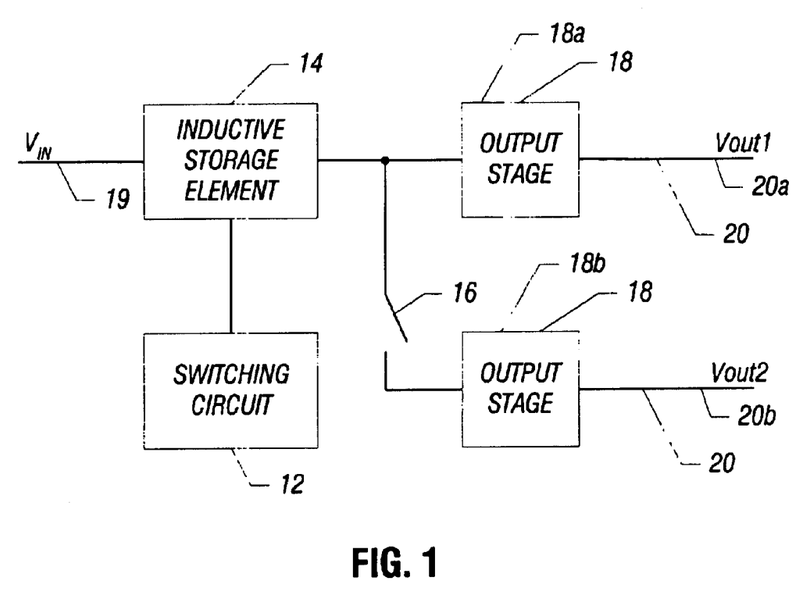
FIGS. 1 and 2 are schematic diagrams of voltage regulation systems according to embodiments of the invention.

Referring to FIG. 1, an embodiment 10 of a voltage regulation system (or alternatively called a "voltage regulator" or a "voltage converter") in accordance with the invention receives an input voltage (called VIN) at an input terminal 19 and uses the input voltage VIN to produce multiple regulated output voltages (output voltages VOUT1 and VOUT2, for example). To accomplish this, the system 10 includes a switching circuit 12 that the system 10 operates to repeatedly energize and de-energize an inductive element 14; and the system 10 includes multiple output stages 18 (such as output stages 18a and 18b, for example) that receive stored energy from the inductive element 14 and convert the stored energy into the output voltages at their output terminals 20. As an example, in some embodiments of the invention, the output stage 18a provides the VOUT1 voltage at an output terminal 20a, and the output stage 18b provides the VOUT2 voltage at an output terminal 20b.

In some embodiments of the invention, the system 10 operates the switching circuit 12 to generate successive and non-overlapping (in time) switching cycles. In each switching cycle, the switching circuit 12 routes energy from the input terminal 19 to energize the inductive element 14 and subsequently in the switching cycle, routes the stored energy from the inductive element 14 to at least one output stage 18 to de-energize the inductive element 14. The time during which the switching circuit 12 energizes the inductive element 14 is called the "on time" of the switching cycle; and the time during which the switching circuit 12 de-energizes the inductive element 14 is called the "off time" of the switching cycle. Thus, each switching cycle has a period, the first part of which is the on time and the second part of which is the off time.

The ratio of the on time to the switching cycle period is called the duty cycle of the switching cycle. Thus, each switching cycle has an associated duty cycle. The system 10 controls the duty cycles of the switching cycles to regulate the VOUT1 and VOUT2 voltages. More specifically, the system 10 controls the durations of the on times of these duty cycles to regulate the VOUT1 and VOUT2 voltages. For a particular switching cycle, a longer duration on time means more energy is stored in the inductive element 14, and the storage of more energy translates into a higher output voltage, as compared to a shorter duration on time in which less energy is stored in the inductive element to produce a smaller output voltage. Therefore, by regulating on times the system 10 regulates the VOUT1 and VOUT2 output voltages.

Unlike the typical voltage regulation system, the system 10 produces multiple regulated output voltages from a single inductive element 14. In the embodiments described herein two output voltages (VOUT1 and VOUT2) are shown and discussed. However, it is understood that the principles described herein may be extended to embodiments of voltage regulation systems that have more than two regulated output voltages.

In some embodiments of the invention, for purposes of regulating both the VOUT1 and VOUT2 output voltages, the system 10 controls some of the switching cycles (called the "VOUT1 switching cycles" herein) to regulate the VOUT1 voltage and controls the remaining switching cycles (called the "VOUT2 switching cycles" herein) to regulate the VOUT2 voltage. As a more specific example, in some embodiments of the invention, the system 10 interleaves (in time) the VOUT1 switching cycles with the VOUT2 switching cycles. Thus, the system 10 controls the duty cycles of the VOUT1 switching cycles to regulate the VOUT1 voltage and controls the duty cycles of the VOUT2 switching cycles to regulate the VOUT2 voltage.

For purposes of accomplishing the above-described multiplexed regulation of the VOUT1 and VOUT2 voltages, the system 10 couples the output stage 18b (that provides the VOUT2 voltage) to the inductive element 14 during the VOUT2 switching cycles and decouples (or isolates) the output stage 18b from the inductive element 14 during the VOUT1 switching cycles. In some embodiments of the invention, the system may include a switch 16 for this purpose so that the switch 16 couples and decouples the output stage 18b to and from the inductive element 14. In this manner, the switch 16 conducts during the VOUT2 switching cycles to couple the output stage 18b to the inductive element 14 and does not conduct during the VOUT1 switching cycles to decouple the output stage 18b from the inductive element 14.

Unlike the output stage 18b, the output stage 18a (that provides the VOUT1 voltage) is coupled to the inductive element 14 during both the VOUT1 and VOUT2 switching cycles, in some embodiments of the invention. However, alternatively, in other embodiments of the invention, the system 10 may couple the output stage 18a to the inductive element 14 during the VOUT1 switching cycles and decouple (or isolate) the output stage 18a from the inductive element 14 during the VOUT2 switching cycles.

Figure 2:
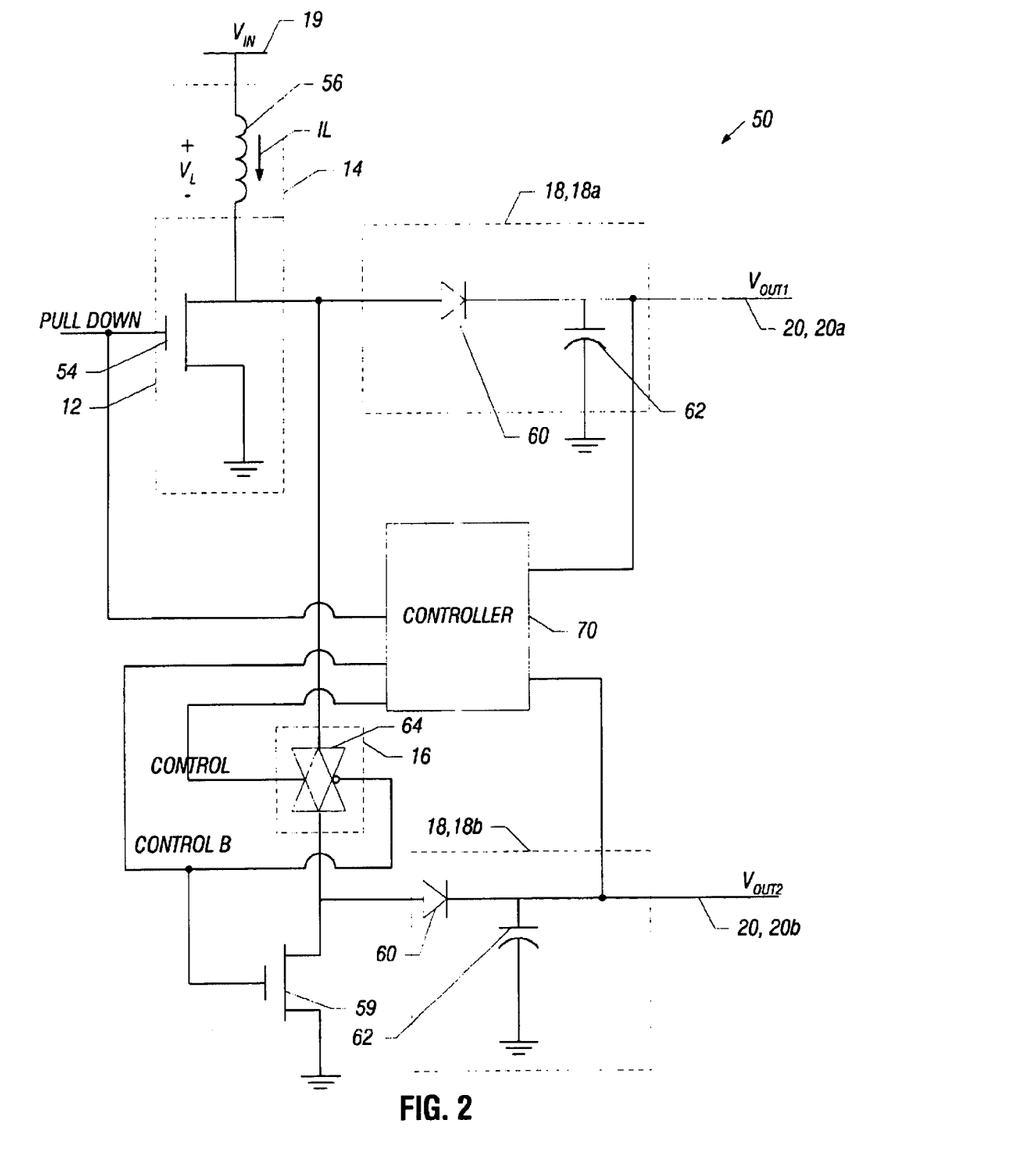

As a more specific example of an embodiment of the system 10 of FIG. 1, FIG. 2 depicts a voltage regulation system 50 that has an overall structure similar to the system 10. The voltage regulation system 50 includes the switching circuit 12, the inductive element 14, the switch 16 and the output stages 18a and 18b. The system 50 also includes a controller 70 to control operations of the switching circuit 12 and the switch 16, as described below.

The system 50 employs a Boost regulator converter topology. In this manner, the switching circuit 12, the inductive element 14 and the output stage 18a generally form a Boost regulator; and the switching circuit 12, the inductive element 14 and the output stage 18b generally form a Boost regulator. However, the system 50 is different from a conventional Boost regulator, for the reasons described herein.

As depicted in FIG. 2, in some embodiments of the invention, the switching circuit 12 includes an n-channel metal-oxide-semiconductor field-effect transistor (NMOSFET) 54, and the inductive element 14 includes an inductor 56. Alternatively, the inductive element 14 may include additional inductors, may be formed from the winding of a transformer, etc. Furthermore, the switching circuit 12 may be formed from multiple transistors, transistors that operate in different phases, etc.

One terminal of the inductor 56 forms the input terminal 19 that receives the VIN input voltage. Another terminal of the inductor 56 is coupled to the drain terminal of the NMOSFET 54. The source terminal of the NMOSFET 54 is coupled to ground, and the gate terminal of the NMOSFET 54 receives a signal called PULLDOWN. The drain terminal of the NMOSFET 54 is also coupled to the output stage 18a.

In some embodiments of the invention, each output stage 18a or 18b has a similar design, denoted by the reference number "18." The output stage 18 includes a diode 60 and a capacitor 62. The cathode of the diode 60 is coupled to the output terminal 20. Thus, the cathode of the diode 60 of the output stage 18a is coupled to the output terminal 20a, and the cathode of the diode of the output stage 18b is coupled to the output terminal 20b. One terminal of the capacitor 62 is coupled to ground, and the other terminal of the capacitor 62 is coupled to the output terminal. The anode terminal of the diode 60 forms the input terminal of the output stage 20. The anode terminal of the diode 60 of the output stage 18a is coupled to the drain terminal of the NMOSFET 54; and the anode terminal of the diode 60 of the output stage 18b is coupled to one terminal of the switch 16 with the other terminal of the switch 16 being connected to the drain terminal of the NMOSFET 54. In some embodiments of the invention, the switch 16 may include a complementary metal-oxide-semiconductor (CMOS) transmission gate, or pass gate 64, that is coupled between the drain terminal of the NMOSFET 54 and the anode terminal of the diode 60 of the output stage 18b. Other embodiments are possible for the switch 16.

Figure 3:
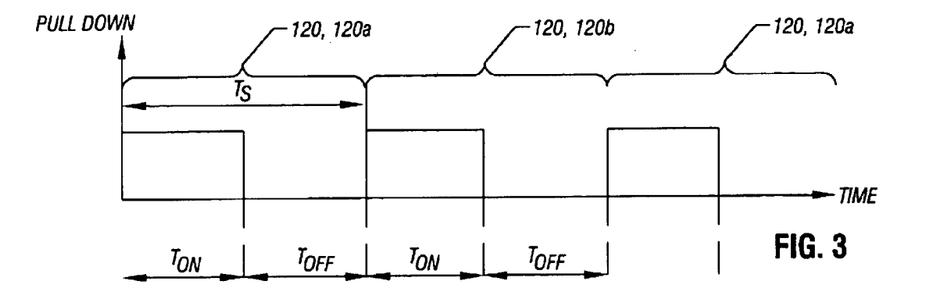
FIGS. 3, 4, 5 and 6 are waveforms of signals of the voltage regulation system of FIG. 2 according to an embodiment of the invention.

The controller 70 monitors the VOUT1 and VOUT2 voltages and controls the PULLDOWN signal in response to these monitored voltages to regulate the VOUT1 and VOUT2 voltages. More specifically, the controller 70 controls the PULLDOWN signal to generate switching cycles. Referring also to FIG. 3, in this manner, the controller 70 operates the NMOSFET 54 (via the PULLDOWN signal) to generate VOUT1 switching cycles 120a to regulate the VOUT1 voltage and generate VOUT2 switching cycles 120b to regulate the VOUT2 voltage. As depicted in FIG. 3, in some embodiments of the invention, the switching cycles 120a may be interleaved in time with the switching cycles 120b. Thus, each switching cycle 120a is followed in time by a switching cycle 120b that is followed in time by a switching cycle 120a that is followed in time by a switching cycle 120b, etc.

Figure 4:
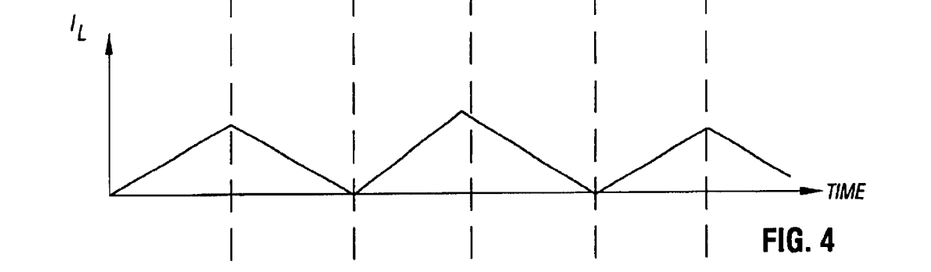

Each switching cycle 120 (where the reference numeral "120" refers to either switching cycle 120a or 120b) has a period (called "TS") that includes a time (called "TON") during which the controller 70 asserts (drives high, for example) the PULLDOWN signal (FIG. 3) for purposes of causing the NMOSFET 54 to conduct. During the conduction of the NMOSFET 54, the inductor 56 is coupled between the VIN input voltage and ground to place the VIN input voltage across the inductor 56, as depicted in FIG. 4. This connection causes energy to be routed through the input terminal 19 to energize, or store energy in, the inductor 56. During this energization of the inductor 56, the current (called "IL") of the inductor 56 ramps upwardly, as depicted in FIG. 4. At the conclusion of the TON interval in the switching cycle 120, an off time interval (called "TOFF") begins. In the TOFF interval, the controller 70 deasserts (drives low, for example) the PULLDOWN signal (FIG. 3) to cause the NMOSFET 54 to not conduct. Depending on the particular embodiment of the invention, the duration of each switching cycle period may be constant; and TON and/or TOFF may be varied to control the output voltages.

Figure 5:
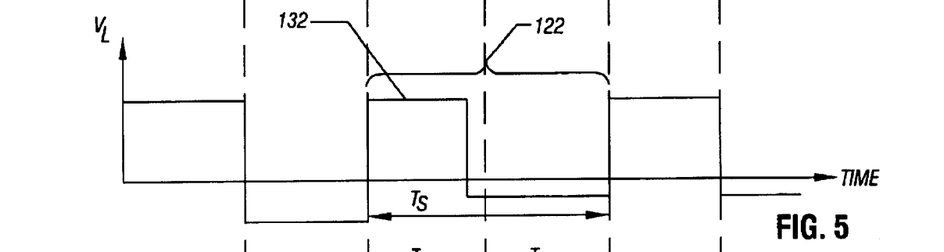
Figure 6:
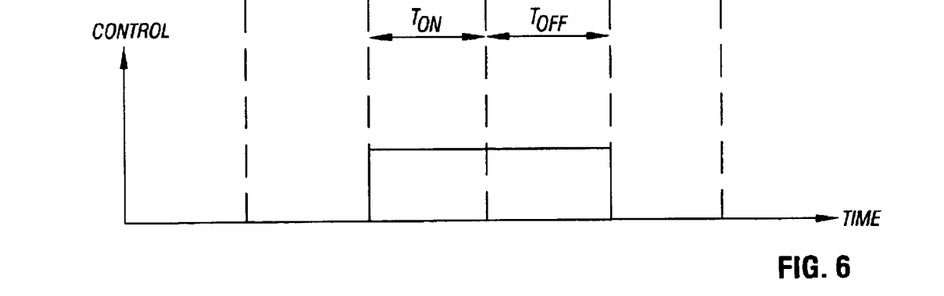

It is during the nonconduction of the NMOSFET 54 that energy is transferred from the inductor 54 into the output stage 18a to de-energize the inductor 56. As depicted in FIG. 4, during this de-energization of the inductor 56, the IL inductor current ramps downwardly, and the VL inductor voltage becomes negative, as depicted in FIG. 5. During the inductor's de-energization, the IL conductor current flows from the inductor 56, through the diode 60 of the output stage 18a and into the capacitor 62 (of the output stage 18a) and the output terminal 20a The result of this energization and deenergization of the inductor 56 is that the VOUT1 output voltage appears at the output terminal 20a. Thus, during each de-energization part of the switching cycle 120a or 120b, stored energy flows from the inductor 56 to the output stage 18a due to the connection of the output stage 18a to the inductor 56.

However, the output stage 18b is only coupled to receive energy from the inductor 56 during the switching cycles 120b. In this manner, the controller 70 operates the pass gate 64 to couple the output stage 18b to the inductor 56 on alternate switching cycles 120 (i.e., the switching cycles 120b), in some embodiments of the invention. Thus, in some embodiments of the invention, both output stages 18a and 18b are coupled to the inductive element 56 during the switching cycles 120b, and only the output stage 18a is coupled to the inductive element 56 during the switching cycles 120a. Therefore, during each switching cycle 120a, stored energy flows from the inductor 56 (during the TOFF time) to the output stage 18a, and during each switching cycle 120b, stored energy flows from the inductor 56 (during the TOFF time) to both output stages 18a and 18b.

Due to this arrangement, the controller 70 controls the duty cycles of the switching cycles 120a to regulate the VOUT1 voltage, and the controller 70 controls the duty cycles of the switching cycles 120b to regulate the VOUT2 voltage. For purposes of coupling the output stage 18b to the inductor 56 during each switching cycle 120b, in some embodiments of the invention, the controller 70 asserts complimentary signals (called CONTROL and CONTROLB) during each switching cycle 120b to cause the pass gate 64 to conduct. When the controller 70 does not assert the CONTROL and CONTROLB signals, the pass gate 64 does not conduct, thereby decoupling the output stage 18b from the inductor 56. The CONTROL signal is depicted in FIG. 5, and the CONTROLB signal is the complement of the CONTROL signal. As shown in FIG. 5, during each switching cycle 120b, the controller 70 asserts (drives high, for example) the CONTROL signal and de-asserts (drives high, for example) the CONTROLB signal to cause the pass gate 64 to conduct to couple the output stage 18b to the inductor 56. During each switching cycle 120a, the controller 70 de-asserts (drives low, for example) the CONTROL signal to cause the pass gate 64 to no longer conduct to decouple the output stage 18b from the inductor 56.

Among the other features of the system 50, in some embodiments of the invention, the system 50 includes a switch, such as an NMOSFET 59, that has its drain terminal coupled to the anode of the diode of the output stage 18b. The source terminal of the NMOSFET 59 is coupled to ground, and the gate terminal of the NMOSFET 59 receives the CONTROLB signal. Due to this arrangement, the NMOSFET 59 conducts during each switching cycle 120a to remove unwanted charge (if any) that may be present on the closest terminal of the pass gate 16. If not removed, this unwanted charge may cause unknown voltages that, in turn, may cause erroneous circuit operation.

In some embodiments of the invention, during powerup of the system 50, the controller 70 continuously de-asserts the CONTROL and CONTROLB signals to isolate the output stage 18b from the inductor 56 until the VOUT1 output voltage rises to its regulated level. Once the VOUT1 voltage reaches this regulated level, the controller 70 begins operating the pass gate 64 to couple the inductor 56 to the output stage 18b during the switching cycles 120b and decouple the output stage 18b from the inductor 56 during the switching cycles 120a, as described above.

In some embodiments of the invention, the voltage regulation system 10, 50 may be part of a Power Supply In Package (PISP) semiconductor package. In this manner, in some embodiments of the invention, all of the circuitry of the system 10, 50 is fabricated on a single silicon die inside the package, except for the two capacitors 62 and the inductor 56, which are also located inside the package with the die.

Figure 7:
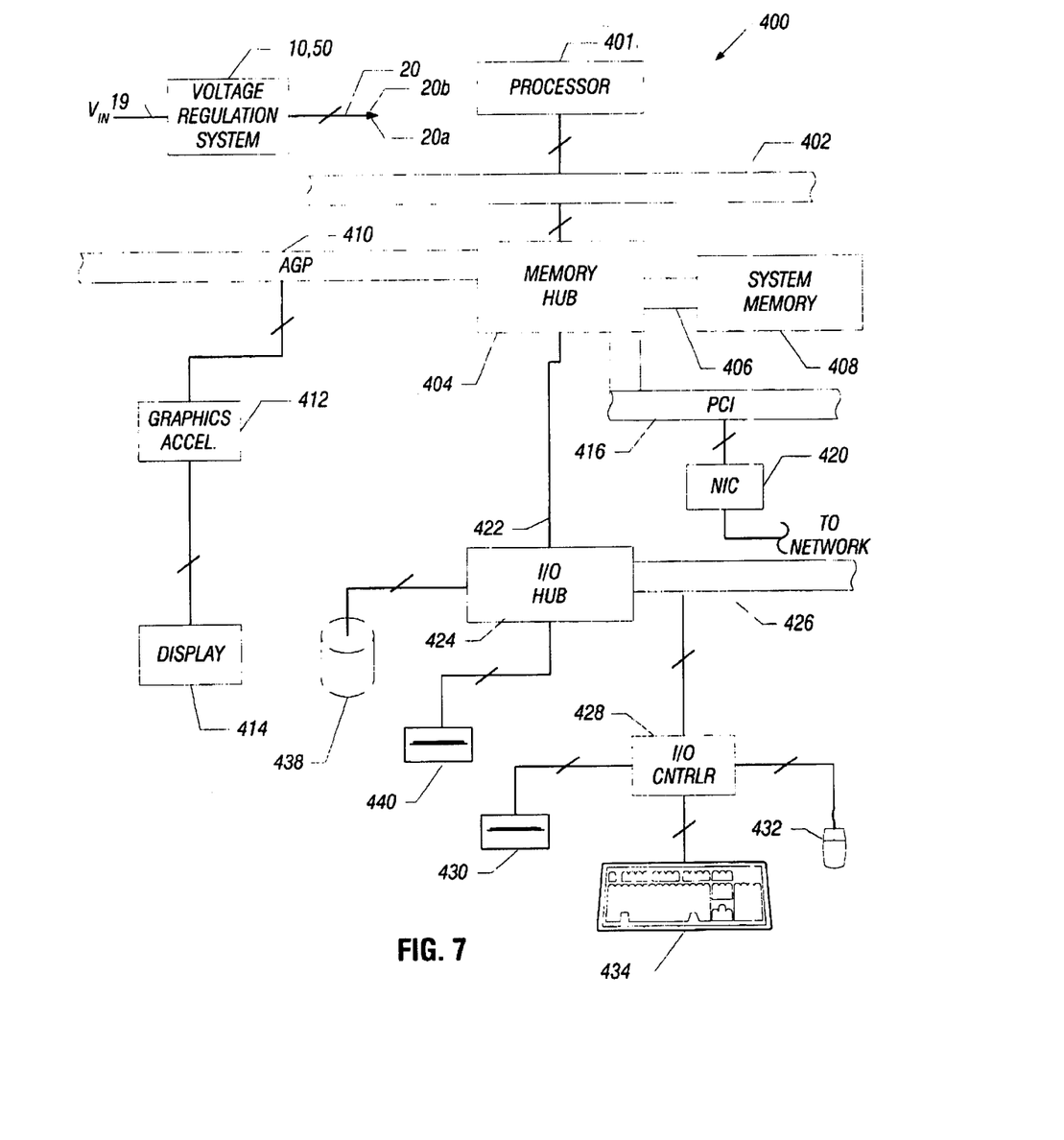
FIG. 7 is a block diagram of a computer system according to an embodiment of the invention.

Referring to FIG. 7, in some embodiments of the invention, the voltage regulation system 10 or 50 may furnish power (via the output terminals 20) to a processor 401 and other components of a computer system 400. In this manner, all or at least part of the processor 401 may be powered by the VOUT1 and/or VOUT2 voltage that is received by the processor 401 and is provided by the voltage regulation system 10, 50. In this context, the term "processor" may refer to, as examples, to at least one microcontroller, X86 microprocessor, Advanced RISC Machine (ARM) microprocessor or Pentium microprocessor. Other types of processors are possible and are within the scope of the following claims.

The processor 401 may be coupled to a local bus 402 along with a north bridge, or memory hub 404. The memory hub 422 may represent a collection of semiconductor devices, or a "chip set," and provide interfaces to a Peripheral Component Interconnect (PCI) bus 416 and an Accelerated Graphics Port (AGP) bus 410. The PCI Specification is available from The PCI Special Interest Group, Portland, Oreg. 97214. The AGP is described in detail in the Accelerated Graphics Port Interface Specification, Revision 1.0, published on Jul. 31, 1996, by Intel Corporation of Santa Clara, Calif.

A graphics accelerator 412 maybe coupled to the AGP bus 410 and provide signals to drive a display 414. The PCI bus 416 maybe coupled to a network interface card (NIC) 420, for example. The memory hub 404 may also provide an interface to a memory bus 406 that is coupled to a system memory 408. In some embodiments of the invention, the voltage regulation system 10 or 50 may be used to provide termination voltages (one half of the logic high voltage, for example) directly to lines of a bus, such as the memory bus 406. The voltage regulation system 10 or 50 may perform this bus termination function more efficiently than a power supply system that provides voltages that are scaled down using voltage dividers for purposes of terminating the bus lines.

A south bridge, or input/output (I/O) hub 424, may be coupled to the memory hub 404 via a hub link 422. The I/O hub 424 represents a collection of semiconductor devices, or a chip set, and provides interfaces for a hard disk drive 438, a CD-ROM drive 440 and an I/O expansion bus 426, as just a few examples. An I/O controller 428 may be coupled to the I/O expansion bus 426 to receive input data from a mouse 432 and a keyboard 434. The I/O controller 428 may also control operations of a floppy disk drive 430.

Figure 8:
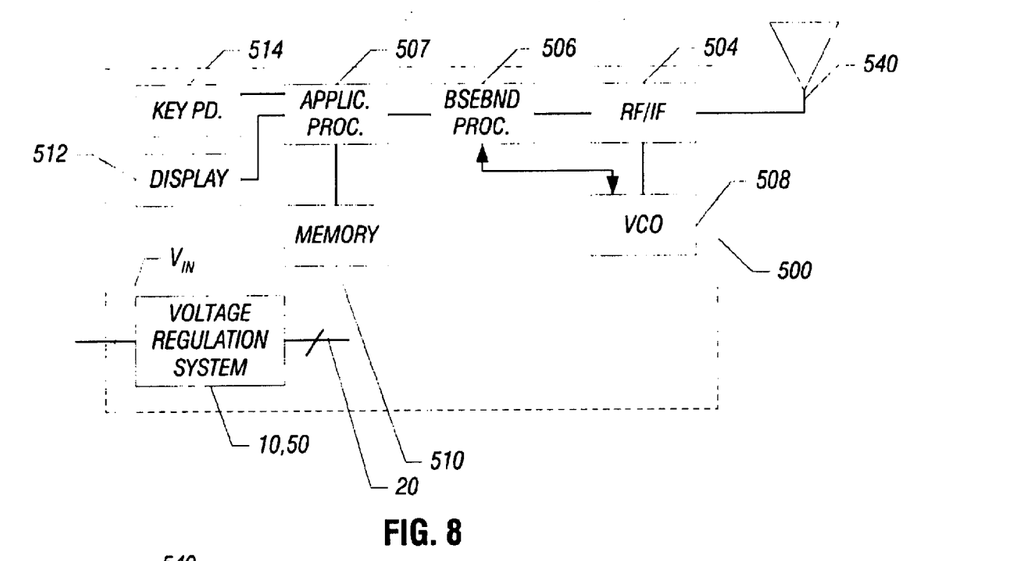
FIG. 8 is a block diagram of a wireless communication device according to an embodiment of the invention.

Referring to FIG. 8, in some embodiments of the invention, the voltage regulation system 10 or 50 may be part of a wireless communication device 500 that may be in accordance with any of the available communication standards. In this manner, the output terminals 20 of the voltage regulation system 10, 50 may provide power to the components of the device 500. These components may include an application processor 507 that executes application programs for the device 500 and a baseband processor 506.

The wireless communication device 500 may also include an antenna 540 (a dipole antenna, for example) that is coupled to a radio frequency/intermediate frequency (RF/IF) interface 504. In some embodiments of the invention, the RF/IF interface receives at least one of the VOUT1 and VOUT2 voltages. In some embodiments of the invention, the baseband processor 506 may communicate with a memory 308 (a flash memory or a dynamic random access memory (DRAM), as examples) that stores data and possibly instructions for the baseband processor 506. All or at least part of the memory 308 is powered by the VOUT1 and/or VOUT2 voltage that is received by the memory 308 and furnished by the system 10, 50. The baseband processor 506 may control a voltage controlled oscillator (VCO) 508 that is coupled to the RF/IF interface 504. The application processor 507 may communicate with several components, such as a keypad 514 as well as a display 512. Furthermore, the application processor 507 may communicate with a memory 510 (a flash memory or a DRAM memory, as examples) for purposes of storing data and possibly retrieving instructions that are executed by the application processor 507.

Figure 9:
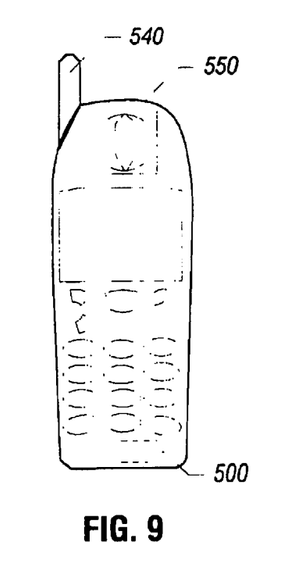
FIG. 9 is a schematic diagram of a cellular telephone according to an embodiment of the invention.
Figure 10:
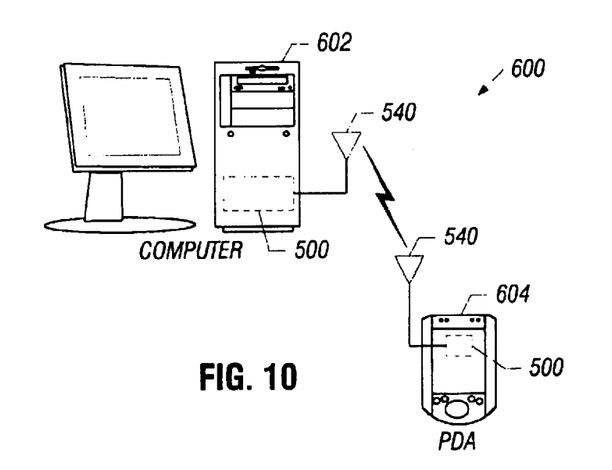
FIG. 10 is a schematic diagram of wireless communication system according to an embodiment of the invention.

The wireless communication device 500 may be used in a variety of different systems. For example, in some embodiments of the invention, the wireless communication device 500 may be part of a cellular telephone 550 that is depicted in FIG. 9. As another example, the wireless communication device 500 may be part of a wireless communication system 600 that is depicted in FIG. 10. In this manner, the wireless communication system 600 may include, for example, a computer 602 that includes a wireless communication device 500; and the wireless communication system 600 may also include a personal digital assistant (PDA) 604 that communicates via a wireless communication link 606 with the computer 602. The wireless communication device 500 may be used in a variety of other wireless communication systems.

Other embodiments are within the scope of the following claims. For example, in other embodiments of the invention, another typology (a forward or a Buck converter topology, as examples) other than a Boost converter typology may be used in embodiments of the voltage regulation system 10, 50. Furthermore, a multiple phase voltage regulation scheme (a three phase or four phase scheme, as examples) may be used in place of the single phase voltage regulation system. Other control schemes than the control schemes described above may be used in some embodiments of the invention. For example, in some embodiments of the invention, the period of the switching cycle may be fixed, and in other embodiments of the invention, the off time of the switching cycle may be fixed, thereby allowing a variable period for the switching cycle. A current mode control scheme may be used in some embodiments of the invention. Other variations are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
   an inductive element;
   at least one switch coupled to the inductive element to generate switching cycles, said at least one switch energizing and de-energizing the inductive element to generate each switching cycle;
   an output stage to provide an output voltage; and
   a circuit to couple the output stage to the inductive element in response to a first set of the switching cycles and decouple the output stage from the inductive element in response to a second set of the switching cycles, the first set of switching cycles not overlapping the second set of switching cycles in time.

2. The system of claim 1, wherein the first set of switching cycles is interleaved in time with the second set of switching cycles.

3. The system of claim 1, wherein the first set of switching cycles is associated with the output voltage and the second set of switching cycles is associated with another output voltage.

4. The system of claim 1, further comprising: another output stage coupled to the inductive element to provide another output voltage.

5. The system of claim 4, wherein the first set of switching cycles is associated with said output voltage and the second set of switching cycles is associated with said another output voltage.

6. The system of claim 5, further comprising:
   a controller to control duty cycles of the first set of switching cycles to regulate said output voltage and control duty cycles of the second set of switching cycles to regulate said another output voltage.

7. The system of claim 4, further comprising:
   a controller to control duty cycles of the switching cycles to regulate said output voltage and said another output voltage.

8. The system of claim 1, wherein the inductive element comprises an inductor.

9. The system of claim 1, wherein the inductive element, said at least one switch, the output stage and the circuit form a Boost switching regulator.

10. A system comprising:
    a processor to receive at least one of a first output voltage and a second output voltage to power at least part of the processor; and
    a voltage regulator to:
       provide the first output voltage at a first output terminal,
       provide the second output voltage at a second output terminal,
       energize and de-energize and a reactive element of the voltage regulator to generate switching cycles, and
       couple the first output terminal to the reactive element in response to a first set of the switching cycles and decouple the first output terminal from the reactive element in response to a second set of the switching cycles, the first set of switching cycles not overlapping the second set of switching cycles in time.

11. The system of claim 10, wherein the first set of switching cycles is interleaved in time with the second set of switching cycles.

12. The system of claim 10, wherein the first set of switching cycles is associated with the first output voltage and the second set of switching cycles is associated with the second output voltage.

13. The system of claim 10, further comprising: a controller to control the duty cycles of the switching cycles to regulate the first output voltage and the second output voltage.

14. The system of claim 10, further comprising: a controller to control the duty cycles of the first set of switching cycles to regulate the first output voltage and control the duty cycles of the second set of switching cycles to regulate the second output voltage.

15. The system of claim 10, wherein the second output terminal is coupled to the inductive element in response to the first set of switching cycles and the second set of switching cycles.

16. The system of claim 10, wherein the voltage regulator comprises a Boost regulator.

17. A method comprising:
    energizing and de-energizing a reactive element to generate a switching cycle;
    repeating the energizing and de-energizing to generate multiple switching cycles;
    coupling a first output terminal that provides a first output voltage to the reactive element in response to a first set of the multiple switching cycles; and
    decoupling the first output terminal from the reactive element in response to a second set of the multiple switching cycles, the first set of switching cycles not overlapping the second set of switching cycles in time.

18. The method of claim 17, wherein the first set of switching cycles is interleaved in time with the second set of switching cycles.

19. The method of claim 17, wherein the first set of switching cycles is associated with the first output voltage and the second set of switching cycles is associated with a second output voltage.

20. The method of claim 17, further comprising: controlling the duty cycles of the multiple switching cycles to regulate the first output voltage and a second output voltage.

21. The method of claim 17, further comprising:
controlling the duty cycles of the first set of multiple switching cycles to regulate the first output voltage; and
controlling the duty cycles of the second set of multiple switching cycles to regulate a second output voltage.

22. The method of claim 17, wherein the coupling the first output terminal comprises coupling a first output stage to the reactive element.

23. A system comprising:
a flash memory to receive at least one of a first output voltage and a second output voltage to power at least part of the flash memory; and
a voltage regulator to:
provide the first output voltage at a first output terminal,
provide the second output voltage at a second output terminal,
energize and de-energize an inductive element of the voltage regulator to generate switching cycles, and
couple the first output terminal to the inductive element in response to a first set of the switching cycles and decouple the first output terminal from the inductive element in response to a second set of the switching cycles, the first set of switching cycles not overlapping the second set of switching cycles in time.

24. The system of claim 23, further comprising: a wireless interface coupled to the voltage regulator to receive at least one of the first output voltage and the second output voltage.

25. The system of claim 23, wherein the system comprises a cellular telephone.

26. The system of claim 23, wherein the system comprises a wireless communication interface.

* * * * *